Patented May 17, 1949

2,470,214

UNITED STATES PATENT OFFICE 2,470,214

SODA LIME

Charles H. Egan, Belmont, Mass., assignor to Dewey and Almy Chemical Company, North Cambridge, Mass., a corporation of Massachusetts No Drawing. Application March 12, 1947, Serial No. 734,235

4 Claims. (Cl. 252—192)

This invention relates to "soda limes." Soda limes may be generally described as metal-calcium hydrates. They are used to absorb acidic gases. Some limes are produced merely by mixing chemical lime (calcium oxide) with a substantial proportion of sodium hydroxide and water, then drying the compound. The more modern soda limes usually incorporate clay, infusorial earth, or other substance containing silicatious matter which has the effect of greatly increasing the porosity of the soda lime and, because there is a reaction between the silicate and the hydroxide, the hardness and abrasion resistance of the limes is greatly increased. Sodium hydroxide is commonly added to the chemical lime, but potassium and lithium hydroxides are also used and are effective in the same proportions. Additionally, hydroxides of alkaline earth metals, particularly barium, are used. In manufacturing soda limes, it is the usual practice to drench chemical lime with a water solution of the metal hydroxide, then pack the wet paste into pans and dry it. During drying the paste hardens because it loses water and because a metal silicate is formed, e. g., sodium silicate is formed in the reaction between sodium hydroxide and the silicatious matter. The cakes are oven dried and then granulated. The granules are classified on screens. Then the sized granules are shipped for loading into the absorber canisters of gas absorption apparatus.

In peacetime, the main use of soda lime is as a carbon dioxide gas absorbent in oxygen rebreathing apparatus and anaesthetic equipment, consequently the capacity of the soda lime to absorb carbon dioxide is of prime importance. Absorption of other acidic gases, save for war purposes, is secondary.

Ordinarily the silicate reaction of soda limes binds the limes so firmly together that the soda lime granules are inherently clean and dust-free. The cake, however, is broken into small irregular bits in the granulation process and when these bits are packed in canisters which are roughly handled the particles abrade each other, wear off the sharp corners and dust is generated. If the soda lime becomes so dusty that small quantities of very finely divided lime are borne out by the gas current passing through the apparatus, the suspended dust is deleterious and may even be dangerous to a patient under anaesthesia.

I have discovered that soda lime particles, pellets, or granules may be treated in such a manner that the limes remain substantially dust free, yet the capacity of the lime to absorb carbon dioxide is practically unaffected. I have found that this desirable property of preventing the dusting of soda lime while maintaining its carbon dioxide absorption potential is possessed by a wide variety of plastic or rubberlike polymers, but is not possessed by many of the recognized "coating materials." For example, dextrine solutions seriously impair the efficiency of the lime to absorb carbon dioxide, but the plastic or rubberlike polymers prevent dusting and do not impair the efficiency of the lime. Apparently effectiveness as an anti-dusting agent in this instance is more a matter of the physical nature of the resulting film than it is a matter of the specific chemical constitution of the treating material. For example, natural rubber, polyisoprenes, butadiene-styrene copolymers, polychloroprenes, and polymers of vinylidene chloride may be used as the treating material with practical interchangeability.

When solutions or water dispersions of these materials are added to the soda lime, they not only form a coating on the particle of soda lime but crawl down the capillaries of porous lime. Even if a granule of such a lime is broken, its particles are not dusty nor will they dust on abrasion. The polymer permeates the whole structure and changes the nature of the whole mass. Glue-like coating materials, on the other hand, tend to encapsulate the granule; although such a coating improves but does not completely prevent the tendency of the lime to dust, it lowers the carbon dioxide absorption efficiency of the lime, often to a ruinous degree.

It is known that certain of these polymeric materials permit the passage of carbon dioxide through membranes formed of their substance. For example, natural rubber and butadiene-styrene copolymers permit substantial quantities of carbon dioxide to pass through thin films. The carbon dioxide transmission coefficient of polymers and copolymers of vinylidene chloride is not nearly so large, yet, for the purposes of this invention, they may be used with equal effect. It seems probable therefore that the carbon dioxide transmission of the polymer itself, while helpful, is not controlling, but that the controlling factor is the characteristic of the polymer to form interlaced permeable nets when spread on the absorptive lime surface.

Most soda limes absorb gas best when they contain from 10 to 20% of moisture. It is usual to pan dry the lime practically to complete dryness, granulate the cake and then add water to the granules until the moisture content rises to the amount desired. The simplest method of carrying out my invention is to dilute a water dispersion of the polymer so that the correct amount of remoistening water will carry the amount of polymer requisite to prevent dusting.

The following procedure was followed in all examples given below:

300 parts by weight of dried, granulated soda lime was placed in a barrel mixer. When the barrel was rotating, 55 parts of a water dispersion containing 1.5 parts of polymeric solids was added to the moving lime and the rotation continued until the water and polymer were uniformly distributed throughout the soda lime. The finished lime contained 0.5% of polymeric solids and 17.3% moisture.

| Polymer | Percent Hardness | Percent U. S. P. | Break-point | Dust |
|---|---|---|---|---|
| | | | Min. | |
| Natural latex | 83.0 | 22.7 | 215 | None. |
| Butadiene-styrene 70-30 ratio | 80.4 | 24.5 | 210 | Do. |
| Butadiene-styrene 50-50 ratio | 84.0 | 23.7 | 225 | Do. |
| Vinylidene chloride-vinyl chloride copolymer | 91.0 | 26.4 | 235 | Do. |
| Polyvinyl chloride | 96.8 | 27.2 | 230 | Do. |
| Polychloroprene | 94.0 | 28.3 | 220 | Do. |

The minimum requirements for untreated soda lime are 80% hardness, 22% U. S. P. and a breakpoint of 200 minutes.

A description of the comparative hardness test used in preparation of the above data follows:

A weighted amount of the 4–8 mesh soda lime is put into a pan with 15 ball bearings of $\tfrac{5}{16}''$ diameter and rotated in a Rotap apparatus for one-half hour. The soda lime is then transferred to an 8-mesh screen, put back on the Rotap for three minutes, and the material left on the screen is weighted. The hardness figure reported is the percentage of original material left on the screen.

The procedure of the breakpoint test used is this: A tube of 45 mm. diameter is filled to a depth of 15 cm. with the soda lime to be tested. Carbon dioxide in a mixture of gases is passed through the tube at a rate of 0.136 g. carbon dioxide per minute. After the sample tube, the gas mixture passes into a solution of barium hydroxide. The breakpoint is the time in minutes that the gas is passed through the sample tube before a white precipitate of barium carbonate appears in the barium hydroxide tube.

The U. S. P. test is the standard test for carbon dioxide absorbency of soda lime given in the United States Pharmacopoeia, twelfth revision, page 561.

Although no quantitative test has as yet been developed which gives a satisfactory numerical value for the dusting property of soda lime, the most satisfactory qualitative test is to fill a glass jar approximately half full of soda lime, cover the jar and shake it vigorously for a definite number of shakes, remove the cover quickly and observe the dust, if any, rising above the rim of the jar. After 12 vigorous shakes, my improved soda limes show no dust whatever rising above the jar. Ordinary limes show a pale, white dust plume under the same conditions.

The above data is reported for a standard hospital lime of the following composition:

| | Per cent |
|---|---|
| Calcium hydroxide | 95.50 |
| Silicatious material | .25 |
| Sodium hydroxide | 1.55 |
| Potassium hydroxide | 2.70 |
| | 100. |

Other limes, for example, those of the following compositions were found when treated as described to be dust free and to give efficiencies not below those of their own untreated samples.

| | Per cent |
|---|---|
| Soda lime, army type: | |
| $Ca(OH)_2$ | 85.5 |
| Silicatious matter | 0.8 |
| NaOH | 13.7 |
| Soda lime, high caustic: | |
| $Ca(OH)_2$ | 74.4 |
| Silicatious matter | 0.7 |
| NaOH | 24.9 |
| Soda lime, high silicate: | |
| $Ca(OH)_2$ | 88.6 |
| Silicatious matter | 6.1 |
| NaOH | 5.3 |

Additionally, a barium lime having the following proportions:

| | Per cent |
|---|---|
| $Ca(OH)_2$ | 12.2 |
| $Ba(OH)_2$ | 87.8 | was treated with a dispersion and then dried to 5.3% moisture. Its efficiency was unaffected. Old style soda lime, which contains:

| | Per cent |
|---|---|
| NaOH | 40 |
| $Ca(OH)_2$ | 60 | was likewise treated and then dried to its normal 5% moisture content. Its carbon dioxide absorption efficiency remained unaffected.

The limits of polymer concentration are matters of economics and good judgment. One-half of 1% will usually prevent all trace of dust. Between ½ and 2% very little change in carbon dioxide absorption efficiency can be discerned. At about 5% polymer concentration, loss of absorption efficiency becomes apparent.

For hospital use, I prefer to use a butadiene-styrene copolymer of 50-50 butadiene-styrene ratio, since it can be stripped of monomer cleanly and is odor free. For industrial use, the choice of polymer is apparently unimportant.

As an alternative to an aqueous dispersion, the polymeric material may be added in solution in an appropriate solvent. In this case, the solvent must be evaporated off and the lime later remoistened to its specified moisture content. Since additional evaporation and remoistening steps are required, and since solvents are expensive and leave an odor objectionable in hospital limes, the solvent method is justified only for particular purposes.

I claim:

1. Soda lime rendered dust free by the incorporation in the same of a polymeric material selected from the class consisting of natural rubber, polyisophene, copolymers of butadiene and styrene, polychloroprene, and polyvinylidene chloride in an amount between one half of 1% and not over 4%.

2. Soda lime rendered dust free by the incorporation in the same of a copolymer of butadiene and styrene in an amount between one half of 1% and not over 4%.

3. Soda lime rendered dust free by the incorporation in the same of polychloroprene in an amount between one half of 1% and not over 4%.

4. Soda lime rendered dust free by the incorporation in the same of natural rubber in an amount between one half of 1% and not over 4%.

CHARLES H. EGAN.

REFERENCES CITED

The following references are of record in the file of this patent:

UNITED STATES PATENTS

| Number | Name | Date |
|---|---|---|
| 270,998 | Taylor | Jan. 23, 1883 |
| 1,335,949 | Wilson | Apr. 6, 1920 |
| 1,977,748 | Webster | Oct. 23, 1934 |
| 2,423,688 | Day | July 8, 1947 |

FOREIGN PATENTS

| Number | Country | Date |
|---|---|---|
| 328,812 | Great Britain | May 8, 1930 |